(12) United States Patent
Mishra et al.

(10) Patent No.: US 10,977,439 B2
(45) Date of Patent: Apr. 13, 2021

(54) CONTROLLABLE STYLE-BASED TEXT TRANSFORMATION

(71) Applicant: International Business Machines Corporation, Armonk, NY (US)

(72) Inventors: Abhijit Mishra, Bangalore (IN); Parag Jain, Bangalore (IN); Amar P. Azad, Bangalore (IN); Karthik Sankaranarayanan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 16/371,492

(22) Filed: Apr. 1, 2019

(65) Prior Publication Data
US 2020/0311195 A1 Oct. 1, 2020

(51) Int. Cl.
| | | |
|---|---|---|
| *G06F 40/00* | (2020.01) | |
| *G06F 40/253* | (2020.01) | |
| *G06N 3/08* | (2006.01) | |
| *G06F 40/151* | (2020.01) | |

(52) U.S. Cl.
CPC .......... *G06F 40/253* (2020.01); *G06F 40/151* (2020.01); *G06N 3/088* (2013.01)

(58) Field of Classification Search
None
See application file for complete search history.

(56) References Cited

U.S. PATENT DOCUMENTS

| | | | | |
|---|---|---|---|---|
| 10,565,757 | B2* | 2/2020 | Oxholm | G06N 3/0454 |
| 2011/0184727 | A1 | 7/2011 | Connor | |
| 2012/0251016 | A1* | 10/2012 | Lyons | G06F 16/345 382/276 |
| 2016/0203129 | A1 | 7/2016 | Leydon et al. | |
| 2017/0039174 | A1 | 2/2017 | Strope et al. | |
| 2017/0185591 | A1 | 6/2017 | Tetreault et al. | |
| 2018/0357800 | A1* | 12/2018 | Oxholm | G06N 3/084 |
| 2019/0079922 | A1* | 3/2019 | Moskowitz | G06Q 10/10 |

OTHER PUBLICATIONS

X. Zhang and C. Liu, "Writer Adaptation with Style Transfer Mapping," in IEEE Transactions on Pattern Analysis and Machine Intelligence, vol. 35, No. 7, pp. 1773-1787, Jul. 2013, doi: 10.1109/TPAMI.2012.239. (Year: 2013).*

(Continued)

*Primary Examiner* — Edgar X Guerra-Erazo
(74) *Attorney, Agent, or Firm* — Ryan, Mason & Lewis, LLP

(57) ABSTRACT

Methods, systems and computer program products for multi-style text transformation are provided herein. A computer-implemented method includes obtaining input text and selecting a set of style specifications for transforming the input text. The set of style specifications include one or more target writing style domains selected from a plurality of writing style domains, weights for each of the target writing style domains representing relative impact of the target writing style domains for transformation of the input text, and weights for each of a set of linguistic aspects for transformation of the input text. The computer-implemented method also includes generating one or more style-transformed output texts based at least in part on the set of style specifications utilizing an unsupervised neural network.

20 Claims, 8 Drawing Sheets

(56) References Cited

OTHER PUBLICATIONS

H. Yang, X. Zhang, F. Yin, J. Sun and C. Liu, "Deep Transfer Mapping for Unsupervised Writer Adaptation," 2018 16th International Conference on Frontiers in Handwriting Recognition (ICFHR), Niagara Falls, NY, 2018, pp. 151-156, doi: 10.1109/ICFHR-2018.2018.00035. (Year: 2018).*
M. Elad and P. Milanfar, "Style Transfer via Texture Synthesis," in IEEE Transactions on Image Processing, vol. 26, No. 5, pp. 2338-2351, May 2017, doi: 10.1109/TIP.2017.2678168. (Year: 2017).*
S. H. H. Ding, B. C. M. Fung, F. Iqbal and W. K. Cheung, "Learning Stylometric Representations for Authorship Analysis," in IEEE Transactions on Cybernetics, vol. 49, No. 1, pp. 107-121, Jan. 2019, doi: 10.1109/TCYB.2017.2766189. (Year: 2019).*
P. Jain et al., "Unsupervised Controllable Text Formalization," Association for the Advancement of Artificial Intelligence, 2019. 9 pages.
T. Shen et al., "Style Transfer from Non-Parallel Text by Cross-Alignment," 31st Conference on Neural Information Processing Systems, 2017. 12 pages.
NLTK 3.4 Documentation, http://www.nltk.org/api/nltk.sentiment.html, Nov. 17, 2018. 7 pages.
S. Chandar et al., "Correlational Neural Networks," Neural Computation 2015. 27 pages.
J. Mueller et al., "Siamese Recurrent Architectures for Learning Sentence Similarity," Proceedings of the Thirtieth AAAI Conference on Artificial Intelligence, 2016. 7 pages.
L. Manevitz et al., "One-Class SVMs for Document Classification," Journal of Machine Learning Research 2, 2001. 16 pages.
M. Artetxe et al., "Unsupervised Neural Machine Translation," arXiv preprint arXiv:1710.11041, 2018. 12 pages.
J. Kabbara et al., "Stylistic Transfer in Natural Language Generation Systems Using Recurrent Neural Networks," Proceedings of the EMNLP 2016 Workshop on Uphill Battles in Language Processing: Scaling Early Achievements to Robust Methods, 2016. 5 pages.
H. Jhamtani et al., "Shakespearizing Modern Language Using Copy-Enriched Sequence-to-Sequence Models," Proceedings of the Workshop on Stylistic Variation, 2017. 10 pages.
J. Ficler et al., "Controlling Linguistic Style Aspects in Neural Language Generation," Proceedings of the Workshop on Stylistic Variation, 2017. 11 pages.
S. Ghosh et al., "Affect-LM: A Neural Language Model for Customizable Affective Text Generation," Proceedings of the 55th Annual Meeting of the Association for Computational Linguistics, 2017. 9 pages.
Z. Hu et al., "Toward Controlled Generation of Text," Proceedings of the 34th International Conference on Machine Learning, 2017. 10 pages.
U.S. Appl. No. 16/046,139, filed Jul. 26, 2018 and entitled "Unsupervised Tunable Stylized Text Transformations."

* cited by examiner

CONTROLLABLE STYLE-BASED TEXT TRANSFORMATION

FIELD

The present invention relates to information technology, and, more particularly, to text transformation.

BACKGROUND

Natural language generation techniques are utilized in a wide variety of application areas, including translators, summarizers and dialog generators. Automated dialog systems or conversation systems, for example, may be used to create various workspaces having different dialog flows for implementing chatbots for customer support, user interaction, etc. A chatbot is a computer program or other software which is capable of carrying out conversational communications via auditory and/or textual processes. Natural language generation techniques may be utilized to generate portions of such conversational communications.

SUMMARY

Embodiments of the invention provide techniques for controllable style-based text transformation.

In one embodiment, a computer-implemented method comprises steps of obtaining input text, selecting a set of style specifications for transforming the input text, the set of style specifications comprising: one or more target writing style domains selected from a plurality of writing style domains; weights for each of the target writing style domains representing relative impact of the target writing style domains for transformation of the input text; and weights for each of a set of linguistic aspects for transformation of the input text, and generating one or more style-transformed output texts based at least in part on the set of style specifications utilizing an unsupervised neural network. The steps are carried out by at least one processing device.

In another embodiment, a computer-implemented method comprises steps of receiving an input text snippet to be style-transformed in accordance with a set of style control parameters specified in a control vector, passing the input text snippet to an unsupervised neural network comprising a plurality of gated recurrent units, determining a hidden representation of the input text snippet utilizing a first subset of the plurality of gated recurrent units arranged in stacked layer providing an encoder, and generating a style-transformed output text snippet utilizing a second subset of the plurality of gated recurrent units providing a decoder, the decoder generating each word of the style-transformed output text snippet utilizing a non-linear function that outputs a probability distribution for a given word of the style-transformed output text snippet based on (i) an embedding of a previously generated word of the style-transformed output text snippet, (ii) the control vector, (iii) a vector obtained by attending over the hidden representation of the input text snippet, and (iv) a hidden state of a decoder of the unsupervised neural network. The steps are carried out by at least one computing device.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
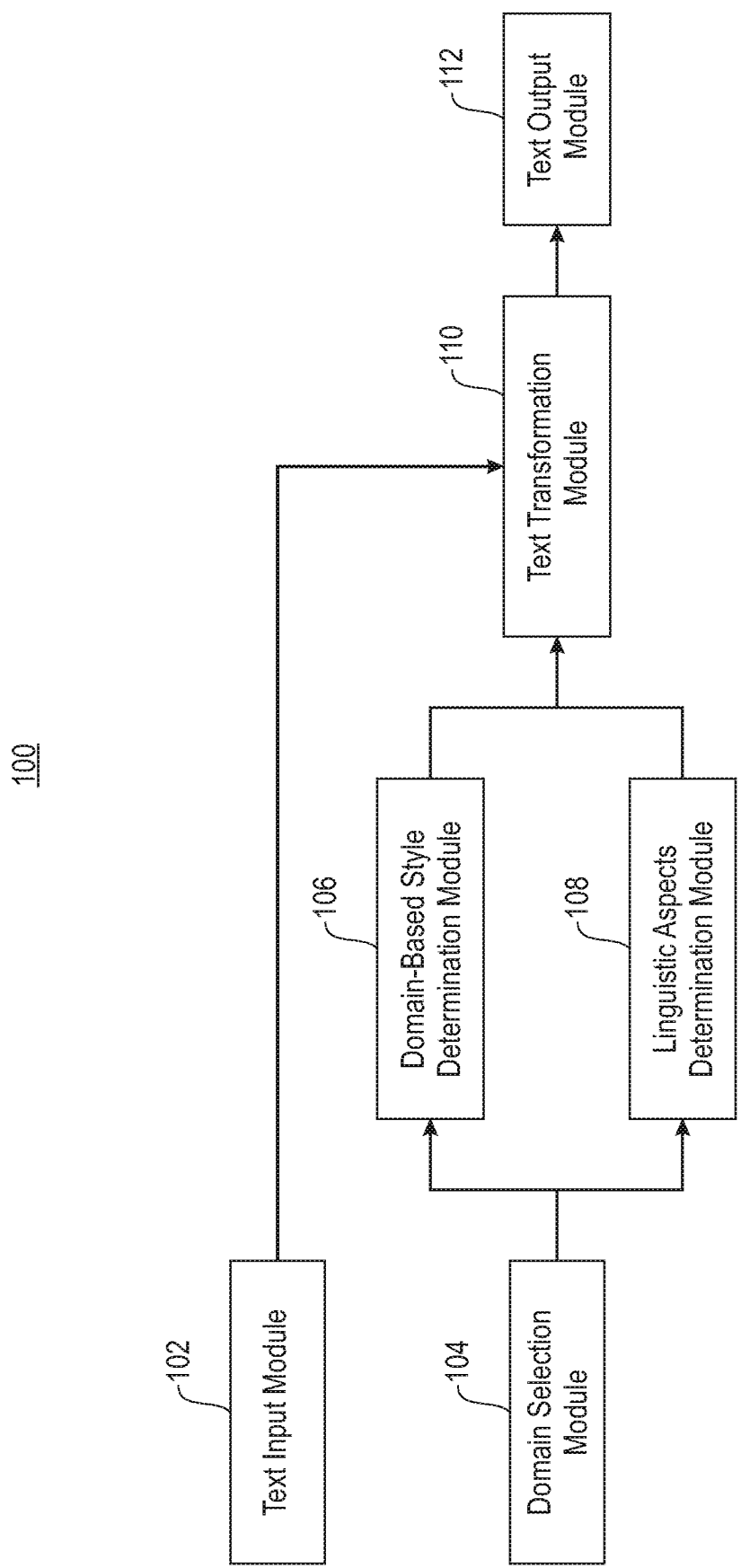
FIG. 1 depicts a tunable multi-style text transformation system, according to an exemplary embodiment of the present invention.

Illustrative embodiments of the invention may be described herein in the context of illustrative methods, systems and devices for controllable style-based text transformation. However, it is to be understood that embodiments of the invention are not limited to the illustrative methods, systems and devices but instead are more broadly applicable to other suitable methods, systems and devices.

In various application scenarios, it is desired to transform text. For example, text transformation is an important problem in the Natural Language Generation (NLG) domain. Text transformation systems such as translators, summarizers, dialog generators, etc. may be used. Techniques are needed, however, for performing text transformation in the "style" domain, where it is desired to produce stylistic variations of a given input text as per some set of defined input style specifications.

Illustrative embodiments enable the transformation of a piece of text into a stylistic variation thereof in accordance with multiple tunable style specifications, where each style specification or requirement can be fuzzily-defined (e.g., the target text should follow domain specific unique styles for specified domains to a certain level or degree as specified by a user) or crisply-defined (e.g., the target text should exhibit certain linguistic properties related to linguistic aspects such as sentiment intensity, formalness, tone, etc., as specified by a user).

Consider, for example, the following scenario. A user desires to transform a piece of text such that the transformed text focuses on a particular aspect of the input and borrows unique writing styles from multiple domains, such as an advertisement domain and a legal domain. Further, the user wants a stronger impact from the advertisement domain as compared to the legal domain. The user opens an interface where the user types in or otherwise provides a text snippet to be transformed. The user also utilizes the interface to select a set of N domains that will impact the style of the target text. The interface may be interactive, in that a pop-up or other notification or request is sent to the user to provide the desired degree of impact of style for each of the specified N domains on the target text. The interface may subsequently query the user via additional input fields to allow the user to provide generic language-specific controls pertaining to tone, formalness, intensity, etc. of the target text. The system takes these various kinds of inputs and produces a stylistic variation of the input text snippet.

Conventional techniques fail to provide for such multi-style text transformation. For example, input text may be run through multiple text generators, with random sampling being used from output word probabilities (e.g., 80% from a first text generator for a first style, and 20% from a second text generator for a second style). In such cases, the sampling is random and thus may mix together words from each of the text generators in a manner that degrades fluency and adequacy. Further, there is no guarantee that the output will conform to any provided style-specific controls.

FIG. 1 illustrates a system 100 that enables controllable stylistic text transformation. In some embodiments, the system 100 utilizes an unsupervised neural network, and is adaptable to addition and removal of various parameters for different styling requirements or specifications. The system 100 includes a text input module 102, where the user is able to type or otherwise enter or provide an input text snippet whose style is to be transformed. The system 100 also includes a domain selection module 104, where the user is able to select various domains for the output text. Based on the selected target domains, the system 100 utilizes a domain-based style determination module 106 to obtain domain-based unique writing styles (e.g., which may be fuzzily-defined) using an interactive interface that allows the user to appropriately weight different ones of the selected target writing style domains. The system 100 utilizes linguistic aspects determination module 108 to obtain linguistic aspects for the target text (e.g., which may be crisply-defined) again using an interactive interface that allows the user to appropriately weight different linguistic aspects. The input text snippet, along with the weights for the domain-based unique writing styles and linguistic aspects, are input to a text transformation module 110 which produces transformed text output via the text output module 112.

An example of use of the FIG. 1 system will now be described. Consider a software developer that has built a text-editor "Editor1" and wants to release it free for non-commercial use. The software developer has written a basic product description for the text-editor: "Editor1 is a free text editor. It supports RegEx based search. It is easy to integrate Editor1 with Editor2." The software developer, however, may believe that this description is too plain to compel people to use the new text-editor. The software developer thus provides the basic product description for the text-editor as an input text snippet 202 (e.g., provided as input to the text input module 102 of system 100). The input text snipper 202, along with a selection of target writing style domains 204 (e.g., provided as input via domain selection module 104 of system 100) for which the generated text should take stylistic flavors from. In this example, the target writing style domains 204 include a "Default" domain, an "Academic" or "Technical" domain, an "Advertisement" domain and a "Legal" domain. It should be appreciated that these domains are presented by way of example only, and that various other domains may be selected including but not limited to e-commerce, health care, tourism, etc. The software developer utilizes an interactive interface 206 (e.g., provided by the domain-based style determination module 106 of system 100) to control the relative impact of the target writing style domains 204 as illustrated by adjusting the sliders for each of the target writing style domains 204. The software developer further utilizes an interactive interface 208 (e.g., provided by the linguistic aspects determination module 108 of system 100) to control the sentiment intensity of the wording and tone or formalness of the generated text as illustrated by adjusting the sliders for the different linguistic aspects.

Figure 2:
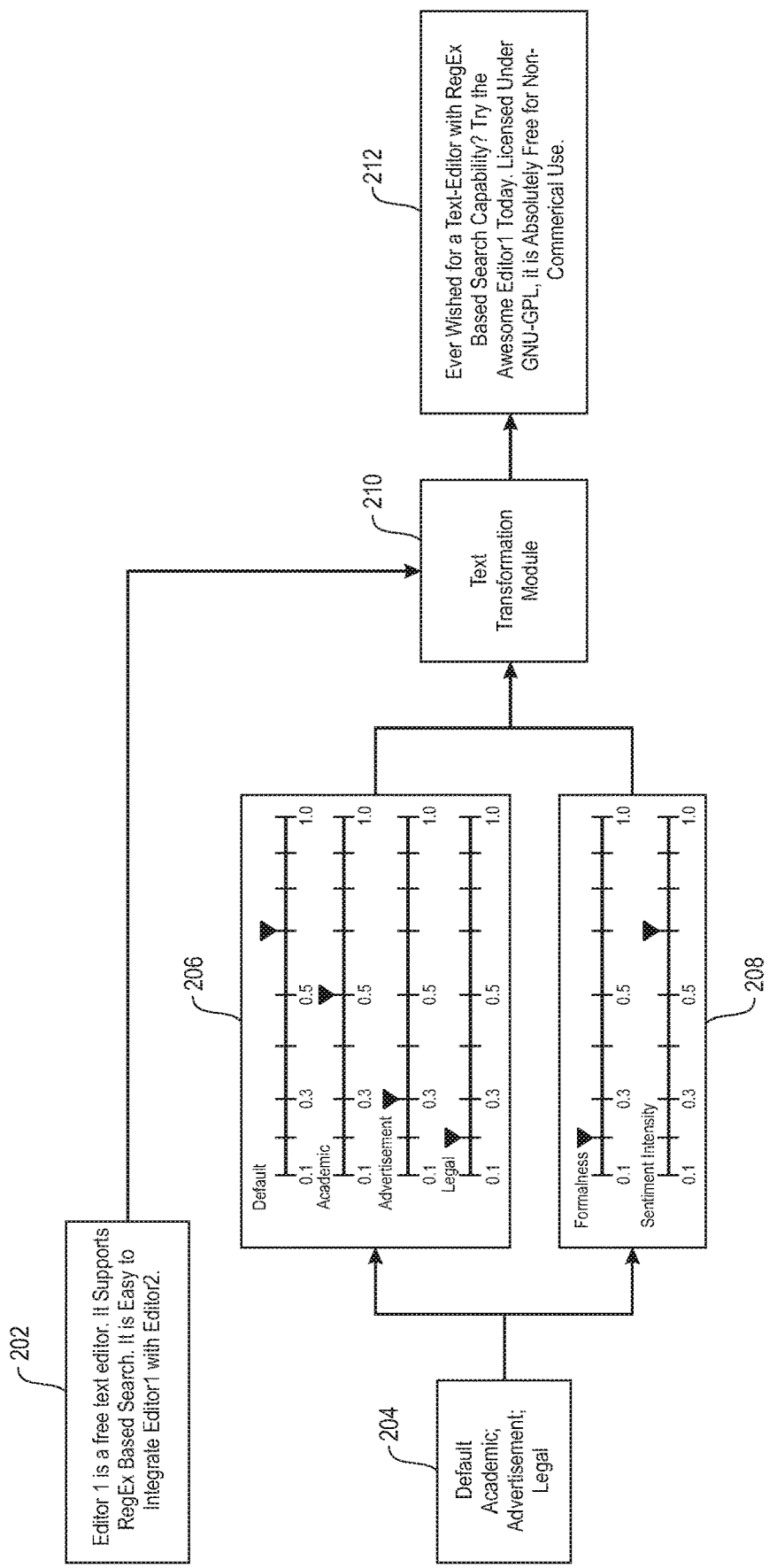
FIG. 2 depicts an example of text transformation utilizing the FIG. 1 system, according to an exemplary embodiment of the present invention.

The various information is provided to a text transformation module 210 (e.g., text transformation module 110 of system 100) that provides an output text 212 "Ever wished for a text-editor with RegEx based search capability? Try the awesome Editor1 today. Licensed under GNU-GPL, it is absolutely free for non-commercial use." It should be appreciated that the generated output text 212 will vary as a function of the selected target domains 204, the domain-based unique writing style specifications 206, and the linguistic aspects specifications 208. For example, if the "Legal" domain is not part of the target domains 204, the generated output text 212 may be "Ever wished for a text-editor with RegEx search capability? Try the awesome Editor1 for free." The software developer, however, may be worried that this product description would lead other users to believe that the new text-editor is free for use in a commercial setup and that the legal aspects were not clear. Through the addition of the "Legal" domain to the target domains 204 with a relatively low impact as specified via the domain-based unique style specifications 206, the generated output text 212 is as shown in FIG. 2, which includes additional language regarding the licensing under GNU-GPL and indicating that the text-editor is free for non-commercial use.

In some embodiments, a system such as system 100 is provided that is configured to transform a piece of text into a stylistic-variation thereof in accordance with multiple tunable style specifications. The tunable style specifications may be fuzzily-defined, such as in the case of domain specific unique writing styles, where the target or output text should follow the domain specific unique writing styles in certain proportions as specified by the user at runtime. The tunable style specifications may also be crisply-defined, such as in the case of clearly defined linguistic aspects where the target or output text should be stylized based on linguistic aspect parameters specified by the user at runtime. The style specifications or requirements are tunable, such as in the case where the proportion of each style specification is provided as a real number input (e.g., see elements 206 and 208 of FIG. 2).

Systems in some embodiments take as input: (i) a text snippet; (ii) a set of N domains from a total set of D domains; (iii) Ns style-strengths of domains of choice; and (iv) L parameters of linguistic aspects. This input is used to produce output text that is a stylized-transformed version of the (i) input text snippet and conforms to the style specifications (ii)-(iv). Systems in some embodiments may be characterized by an ability to learn to perform style transformation in an unsupervised setting for each domain in appropriate proportion specified by the user by considering a large-scale unlabeled corpus for each representative domain D, and for each linguistic-aspect parameter from L by relying on natural language processing (NLP) tools that can measure that parameter. Systems in some embodiments are also characterized by generalizability, in that the systems can be trained for any finite set of writing style domains and linguistic parameters as long as domain-specific unlabeled corpora and NLP tools are available.

For D different domains and L different linguistic parameters, the system in some embodiments utilizes D domain-specific unlabeled corpora (e.g., that are deemed to contain unique domain-specific styles of writing for the D domains) and L NLP tools. The system may be viewed as including four main components: a shared encoder and decoder, a domain unique-style strength scorer, a language aspect scorer, and a domain classifier. Examples of these components will now be described with respect to FIG. 3, which shows a workflow in a system for generating stylistic text transformation.

Figure 3:
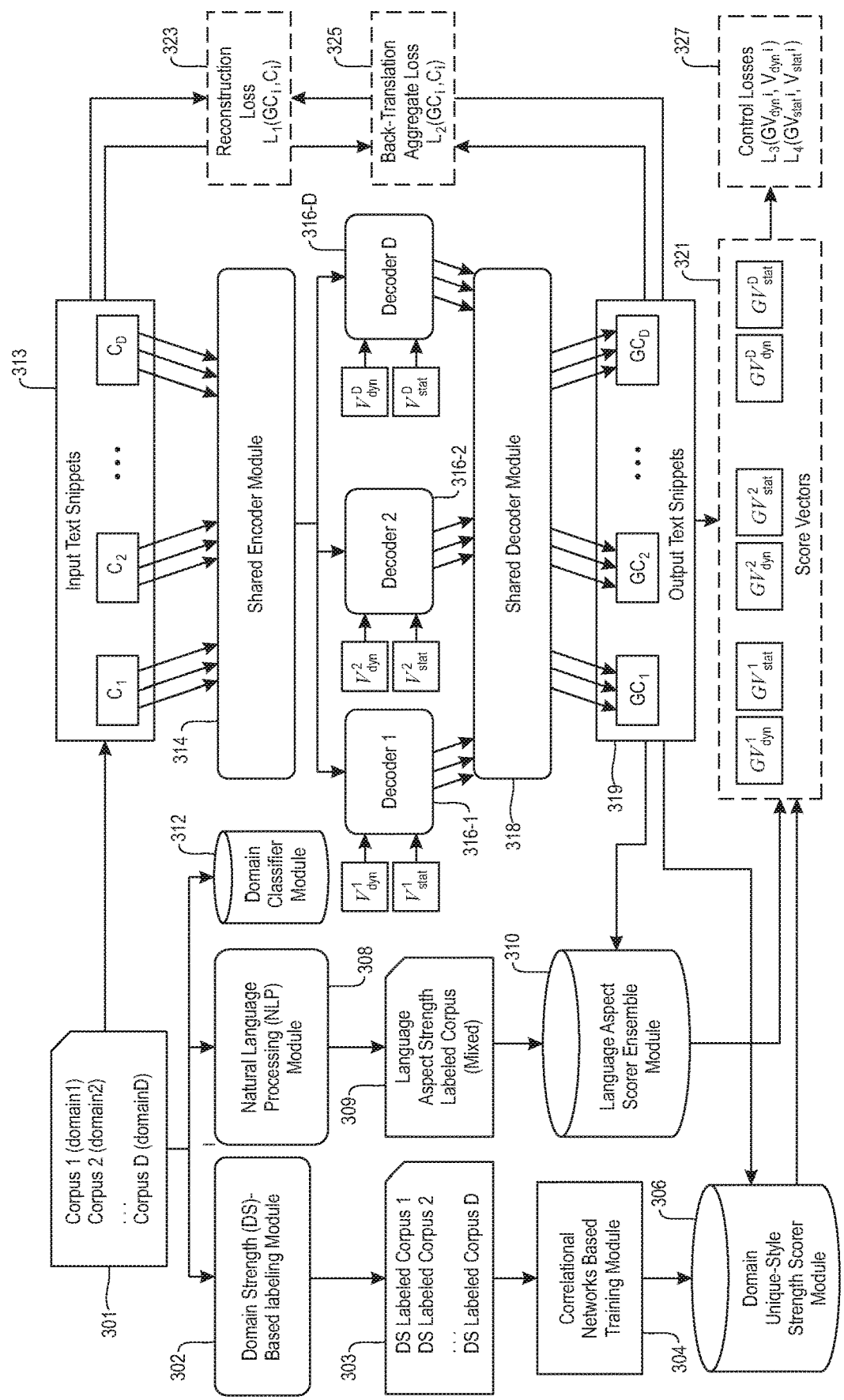
FIG. 3 depicts another tunable multi-style text transformation system, according to an exemplary embodiment of the present invention.

In a training stage or phase, the FIG. 3 system trains a domain unique-style strength scorer module 306, a language aspect scorer ensemble module 310 and a domain classifier module 312 utilizing corpora 301 and NLP tools. A shared encoder module 314, decoders 316-1, 316-2, . . . 316-D (collectively, decoders 316) and shared decoder module 318 are trained with a specific corpora and the overall network is trained by minimizing composite losses capturing fluency, adequacy in transformation, and semantic-relatedness of the output text snippets 319 with respect to the input text snippets 313 and the style specifications. In a testing stage or phase, the domain of input text is determined in real time utilizing the domain classifier module 312, and based on the domain of the input text, an appropriate one of the decoders 316 is selected. The input text is encoded using the shared encoder module 314, and the encoded information along with input style-parameters are passed through the selected decoder 316 and through to the shared decoder module 318 which produces the transformed output (e.g., output text snippets 319).

Techniques for preparing the domain unique-style strength scorer module 306, the language aspect scorer ensemble module 310, and domain classifier module 312 will now be described. The domain unique-style strength scorer module 306 takes text as input and provides a list of scores, each score indicating to what degree the text follows the style of a domain. In some embodiments, the domain unique-style strength scorer module 306 utilizes a neural regressor. For training the domain unique-style strength scorer module 306, a one-hot list of labels is prepared for each sentence (e.g., where if the sentence belongs to a certain domain, the corresponding score is 1, otherwise the score is 0) utilizing a domain strength (DS)-based labeling module 302 that outputs DS labeled corpora 303 from the input corpora 301. The correlational networks based training module 304 takes the DS labeled corpora 303 and provides the training for the domain unique-style strength scorer module 306.

The language aspect scorer ensemble module 310 takes text as input and computes scores corresponding to each of a set of language or linguistic aspects. The language aspect scorer ensemble module 310 may utilize multiple regressors or classifiers (e.g., depending on the nature of the output), each responsible for measuring a certain language aspect. The regressors or classifiers of the language aspect scorer ensemble module 310 are trained in a supervised setting in some embodiments, using techniques such as Support Vector Regressions, for which labeled data are generated by processing multiple input corpora 301 with NLP tools provided by NLP module 308. For example, if the user desires to have two linguistic aspects be measured (e.g., sentiment intensity and formalness), corresponding NLP tools from an NLP tool library can be used to produce labeled data in the form of language aspect strength labeled corpus 309, which is provided to the language aspect scorer ensemble module 310 for training.

The domain classifier module 312 takes text as input, and determines a domain to which the text belongs. For training, the domain classifier module 312 utilizes input corpora 301 for different domains along with their associated domain labels. Various classification techniques may be utilized by the domain classifier module 312, including unsupervised machine learning techniques.

The core encoder and decoder (e.g., shared encoder module 314, decoders 316 and shared decoder module 318) are configured as follows. For D domains, the core encoder and decoder should have D number of input text snippets 313, the shared encoder module 314, D decoders 316, and the shared decoder module 318. The input to the shared encoder module 314 is input text snippets 313 $C_1, C_2, \ldots C_D$. The shared encoder module 314 encodes these snippets into corresponding embeddings which are provided to the appropriate decoders 316. The decoders 316 are capable of taking additional inputs as shown, which correspond to domain-specific ("dynamic" or "dyn") specifications referred to as $V_{dyn}^i$ and language aspect ("static" to "stat") specifications referred to as $V_{stat}^i$. In some embodiments, the shared encoder module 314, decoders 316 and shared decoder module 318 utilize recurrent neural units.

To train the core encoder and decoder, an iterative process is utilized where one input text snippet from one domain specific corpus is considered at a time. In each step, a text snippet $C_i$ from one corpus is selected. In the description below, it is assumed that a text snippet $C_1$ from domain 1 is selected. The default dynamic specifications $V_{dyn}^1$ are set to 1, and the rest of $V_{dyn}^i$ (where $i \neq 1$) are set to 0. The default language or linguistic aspects for the snippet $V_{stat}^1$ are computed using an NLP module 308, and the rest of $V_{stat}^i$ (where $i \neq 1$) are set to 0 vectors. $C_1$ is encoded by the shared encoder module 314 and passed through the D decoders 316 which also accept $V_{dyn}^i$ and $V_{stat}^i$ as input. The outputs of the decoders 316 are passed through the shared decoder module 318, which combines the different decoder outputs to produce the output text snippet $GC_1$. The output $GC_1$ is passed through the domain unique-style strength scorer module 306 and the language aspect scorer ensemble module 310, which produce score vectors 321 of $GV_{dyn}^1$ and $GV_{stat}^1$, respectively, for all domains and all language aspects.

Learning of transformation is achieved using a set of losses 323, 325 and 327. The loss 323, referred to as a reconstruction loss, is defined as $L_1(GC_i, C_i)$ and ensures that the model is capable of generating fluent sentences following the fluency of the input text. The loss 325, referred to as a back-translation loss, is defined as $L_2(GC_i, C_i)$ and is a composite loss (including D loss terms for D domains). Each loss term is calculated by performing back-translation through all but the current decoder. The losses 327 are referred to as control losses, and include a dynamic-control loss and a static-control loss. The dynamic-control loss, defined as $L_3(GV_{dyn}^i, V_{dyn}^i)$, indicates the gap between the input domain-strength specification and the measured strength of the output text. The static-control loss, defined as $L_4$ ($GV_{stat}^i$, $V_{stat}^i$), indicates the gap between the input linguistic-aspect specifications and the measured linguistic aspects of the output text. Various differentiable loss functions may be used to calculate the losses 323, 325, and 327, including categorical cross-entropy and squared loss. For optimization and validation, standard neural settings can be used.

To test the core encoder and decoder, input text C is pre-processed (e.g., normalized) and passed through the domain classifier module 312 to detect the default domain of the input text. For each domain specified by the user, the corresponding decoders 316 are activated, and the rest are deactivated (e.g., they receive null input). The input text C along with domain-strength and language-aspect values are appropriately input to the system and the output GC is returned.

The FIG. 3 system utilizes domain specific corpora 301 for each domain involved. The core encoder and decoder (e.g., shared encoder module 314, decoders 316 and shared decoder module 318) are assumed to be implemented utilizing deep learning execution platforms (e.g., Tensorflow, Pytorch, keras, caffe, etc.) or other types of deep learning or machine learning platforms. For each tunable language-aspect parameter, it is assumed that the NLP module 308 includes an NLP tool (e.g., classifiers, regressors, metric computation systems, etc.) for measuring that parameter. Further, various aspects of the FIG. 3 system assume the availability and use of NLP frameworks for text normalization, tokenization, learning embedding, semantic relatedness measurements, etc.

To extend the FIG. 3 system to add or remove domains or language aspect parameters, the following techniques are used. To add a new domain-unique style, an associated domain-specific corpus for that domain should be obtained. A separate decoder 316 for the newly-added domain should be appended to the system, and the system is re-trained. To add a new language-aspect parameter, a corresponding NLP framework for measuring that parameter is obtained and the system undergoes training again with the existing datasets. For removing a domain or language-aspect parameter, the corresponding components are removed from the FIG. 3 system, and re-training is not necessary but may be performed as desired.

The systems described herein for multi-style text transformation may be used in a wide variety of application areas, including various NLG systems such as intelligent dialog systems, persuasive NLG systems, augmented services, and other types of NLG-related services including automatic specification, manual creators, automatic content writers, etc.

In some embodiments, a framework for controllable natural language transformation is provided. Realizing that the requirement of parallel corpus is practically unsustainable for controllable generation tasks, an unsupervised training scheme is introduced in some embodiments. The framework utilizes a deep neural encoder-decoder that is reinforced with text-transformation knowledge through auxiliary modules, also referred to herein as scorers. The scorers, based on NLP tools, decide the learning scheme of the encoder-decoder based on its actions. The framework may be applied to various text-transformation tasks, where the type and degree of style-based transformation can be controlled by the user at runtime.

Automatic text style-transformation is a key goal of text-to-text NLG. Conventional approaches for such text-to-text transformation are often either supervised, utilize statistical machine translation models, or are template and rule based. Supervised NLG requires a large-scale parallel corpora for training, which is a major impediment in scaling to diverse use-cases. For example, in the context of automated dialog systems alone, there are several scenarios where a system's answer (which may be coming from a database) needs to be transformed either for its tone (e.g., politeness, excitedness, etc.) level of formality (e.g., casual, formal, etc. based on the user's personality), or complexity (e.g., simplifying linguistic or domain-specific terminology such as in legal or medical domains). As such requirements and use-cases continue to grow, it is practically unsustainable to obtain large scale parallel corpora for each such text transformation task.

From a scientific perspective, a supervised treatment of all such tasks using several parallel corpora seeks to learn both the language transformation (e.g., so as to preserve semantics) and the style transformation simultaneously for each task. A number of observations are made with respect to this. First, since the preservation of language semantics is necessary for transformation, whereas only the attribute or style of the text needs to be changed, it should be possible to decouple these two aspects. Second, it should be cheaper computationally to independently verify these aspects at the output stage (e.g., with NLP techniques) than it is to specify the required transformation for each input text with its output example. Third, it should be possible to control the degree or magnitude of an intended attribute (e.g., readability level, politeness level, etc.) required at the output. These observations are considered in developing an unsupervised approach to style-based text transformation.

In some embodiments, the framework relies only on unlabeled texts for initialization along with an ensemble of NLP modules. The frameworks described herein may be used for various style transformation tasks subset to user-selected controls. For example, referring again to FIG. 2, the user-selected controls or style specifications may include different target writing style domain attributes (e.g., Academic, Advertisement, Legal) with their corresponding levels, intensity or other weight (e.g., in a normalized scale of 0 to 1 in element 206 of FIG. 2 as described above). Advantageously, frameworks described herein are capable of performing style-based text transformation with fuzzily-defined target writing style domain features, possibly in combination with crisply-defined linguistic aspects. As one example of linguistic style transformation, consider the task of "formalization" of input text, which is relevant to a number of NLG applications, such as formal conversation generation, email response composition, summary document generation in compliance and regulatory domains, etc. Moreover, such a system for text formalization can provide assistance to professional writers in a manner similar to that of Computer Assisted Translation (CAT) systems that assist human translators, thus paving the way for cost- and time-effective solutions for content creation.

In some embodiments, the framework is built using an encoder-decoder module that is pre-trained with unlabeled texts. The decoder may additionally take as input user-specific control parameters (e.g., for domain-based unique styles and linguistic aspects). Knowledge of the desired transformation is acquired through the use of auxiliary modules or scorers, which decide the learning scheme of the encoder-decoder based on its actions. The scores may be based on NLP tools that produce scores indicating, for example, how formal generated text is, whether generated text is fluent, and whether the generated text carries similar semantics as the input, whether generated text corresponds to selected target writing style domains, etc. The framework may be trained in multiple iterations, where each iteration includes two phases of exploration and exploitation. In the exploration phase, the decoder randomly samples candidate texts for given inputs and with the help of the scorers automatically produces training data for controllable generation. In the exploitation phase, the encoder-decoder is retrained with the examples thus generated.

Unsupervised NLG is challenging due to: (i) the fact that the output space is more complex and structured, making unsupervised learning more difficult; and (ii) the fact that metrics for evaluating NLG systems without reference output text are elusive. In some systems, architectures for unsupervised language translation with unsupervised auto-encoder-based lexicon induction techniques may be used. Such approaches primarily focus on cross-lingual transformation, and require multiple unlabeled corpora from different languages. As such, these approaches are difficult to extend for controllable text-transformation goals within a single language, and further there is no notion of style-based control in language translation. Techniques for controllable generation may utilize or take into account control parameters like sentiment, tense, etc., and generate random sentences conforming to the controls. However, these systems do not transform a given input text, but rather only sample text randomly based on user provided controls.

In other approaches, a variational autoencoder (VAE) is jointly trained with an outcome prediction module to correct an input such that the output has a higher expected outcome. VAE/outcome prediction systems, however, may fail to preserve semantic relatedness between the input and the output, which is necessary for many text-transformation tasks. Further, VAE/outcome prediction systems do not take into account external control parameters. Other approaches may be based on sentiment and attribute-based unsupervised style transfer, semi-supervised transfer through back translation using a translation corpora, formal-informal text classification using linguistic features, politeness analysis, polite-conversation generation using encoder-decoder models, etc. These approaches, however, do not perform controllable text-transformation. Similarly, generation frameworks for formal text generation and paraphrase generation are either template based or supervised, and are not controllable. Language generation systems that incorporate NLP-based scorers are unsupervised, but suffer from convergence problems while training.

The framework used in some embodiments is designed to take text input (e.g., a sentence) and a set of control parameters (e.g., domain-based unique style parameters that are fuzzily-defined and linguistic aspect parameters that are crisply-defined).

The core encoder and decoder of FIG. 3 may utilize a framework and learning scheme which includes pre-training and multiple iterations of exploration and exploitation. As shown in FIG. 3, each of the decoders 316 includes control inputs $V_{dyn}^i$ (for target writing style domains) and $V_{stat}^i$ (for linguistic aspects). The control inputs may be passed through an embedding layer.

The core encoder and decoder of FIG. 3 may be pre-trained, such that in the first iteration of exploration the shared decoder module 318 produces an output GC that is the same as the input C. Since the sampled sentences are assumed to have a better score (or they would not be selected), the first iteration of exploration ensures that the output of synthesized data GC is different than the input C and has a better cumulative score (e.g., score vectors $GV_{dyn}$ and $GV_{stat}$) than the input C. In the exploitation phase, the shared encoder module 314, decoders 316 and shared decoder module 318 are trained using data generated during the exploration phase.

The shared encoding module 314, decoders 316 and shared decoder module 318 may undergo training in a classification setup where batches of labeled data are fed in multiple iterations and the various losses (e.g., $L_1, L_2, L_3$ and $L_4$) are minimized.

Figure 4:
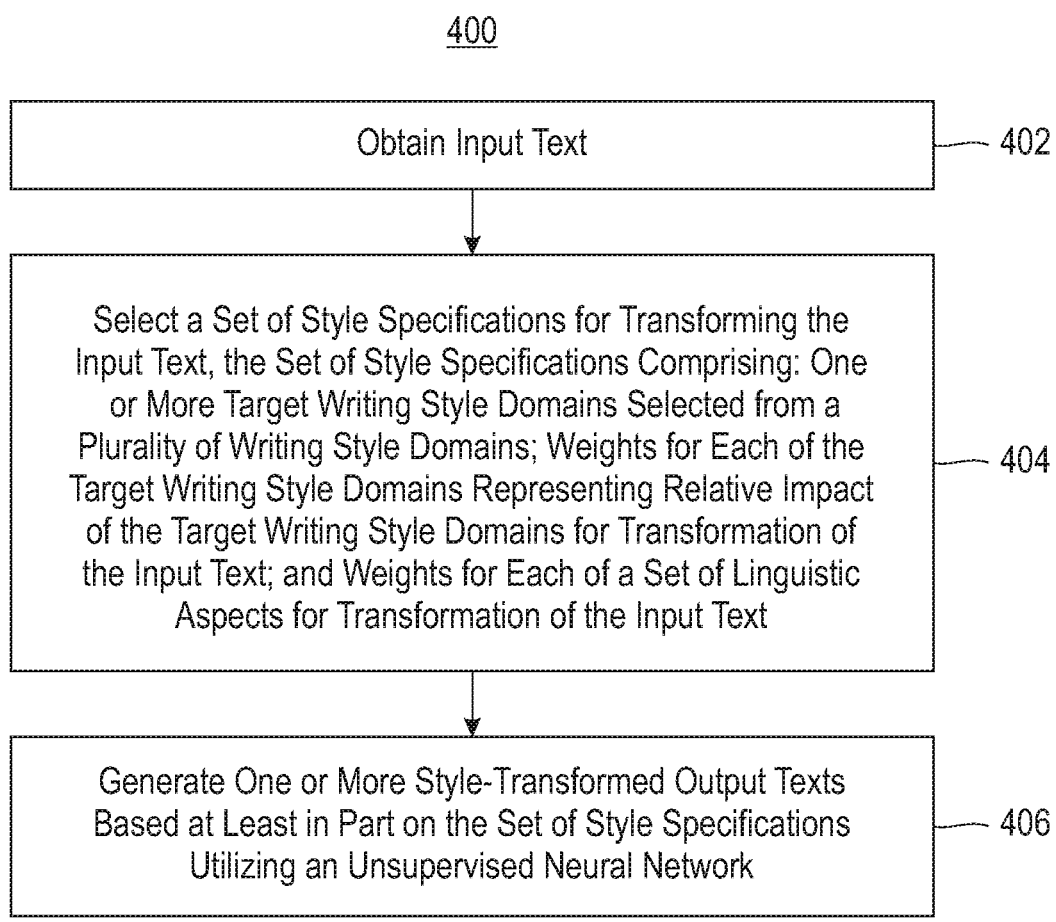
FIG. 4 depicts a process for controllable style-based text transformation, according to an exemplary embodiment of the present invention.

FIG. 4 depicts a process flow 400 for controllable style-based text transformation. The process flow 400 begins with step 402, obtaining input text that is to be transformed. In step 404, a set of style specification are selected for transforming the input text obtained in step 402. The set of style specifications comprise one or more target writing style domains selected from a plurality of writing style domains, weights for each of the target writing style domains representing relative impact of the target writing style domains for transformation of the input text, and weights for each of a set of linguistic aspects for transformation of the input text. The plurality of writing style domains may comprise a default domain, an academic domain, a technical domain, an advertisement domain, a legal domain, a medical domain, etc. The set of linguistic aspects may comprise formalness, sentiment intensity, tone, etc.

In some embodiments, step 404 includes providing real number inputs as the weights for the selected target writing style domains in proportion to a desired relative impact of the selected target writing style domains on the style-transformed output texts. Step 404 may also include providing real number inputs as the weights for each of the set of linguistic aspects corresponding to a desired impact of the linguistic aspects on the style-transformed output texts.

The process flow 400 continues with step 406, generating one or more style-transformed output texts based at least in part on the set of style specifications utilizing an unsupervised neural network. The unsupervised neural network may comprise a deep learning network comprising a plurality of GRUs.

In some embodiments, step 406 includes: generating embeddings for the input text, generating domain-specific style-transformed output text utilizing each of a subset of a plurality of decoders, the subset of the plurality of decoders being associated with the selected target writing style domains and being provided with the embeddings for the input text, the weights for the selected target writing style domains, and the weights for the set of linguistic aspects; and generating a given one of the style-transformed output texts as a combination of the domain-specific style-transformed output texts from each of the subset of the plurality of decoders.

The process flow 400 may further include training the unsupervised neural network. Training the unsupervised neural network may comprise: generating an embedding for a given training text from a given one of the plurality of domains; generating domain-specific style-transformed training output texts utilizing a plurality of decoders associated with the plurality of writing style domains, a given one of the decoders corresponding to the given domain being provided with a set of training weights for a set of training writing style domains and the set of linguistic aspects, other ones of the decoders corresponding to other ones of the plurality of domains being provided with null weights for the training writing style domains and the set of linguistic aspects; and generating a given style-transformed training output text as a combination of the domain-specific style-transformed training output texts from the plurality of decoders.

Training the unsupervised neural network may further comprise: determining a domain style score vector for the given style-transformed training output text, the domain style score vector comprising a list of scores each indicating to what degree the given style-transformed training output text follows the style of one of a set of training writing style domains; and determining a linguistic aspect score vector for the given style-transformed output text, the linguistic aspect score vector comprising a score corresponding to each of the set of linguistic aspects computed using a natural language processing tool trained for that linguistic aspect. Training the unsupervised neural network may further include computing a number of loss metrics, and minimizing such loss metrics. The loss metrics may include a first control loss indicating a gap between (i) the training weights for the set of training writing style domains and (ii) the scores in the domain style score vector, a second control loss indicating a gap between (i) the training weights for the set of linguistic aspects; and (ii) the scores in the linguistic aspect score vector, a reconstruction loss by comparing a fluency of the training input text and a fluency of the given style-transformed training output text, and a back-translation loss by performing back-translation of the given style-transformed training output text through the plurality of decoders.

Figure 5:
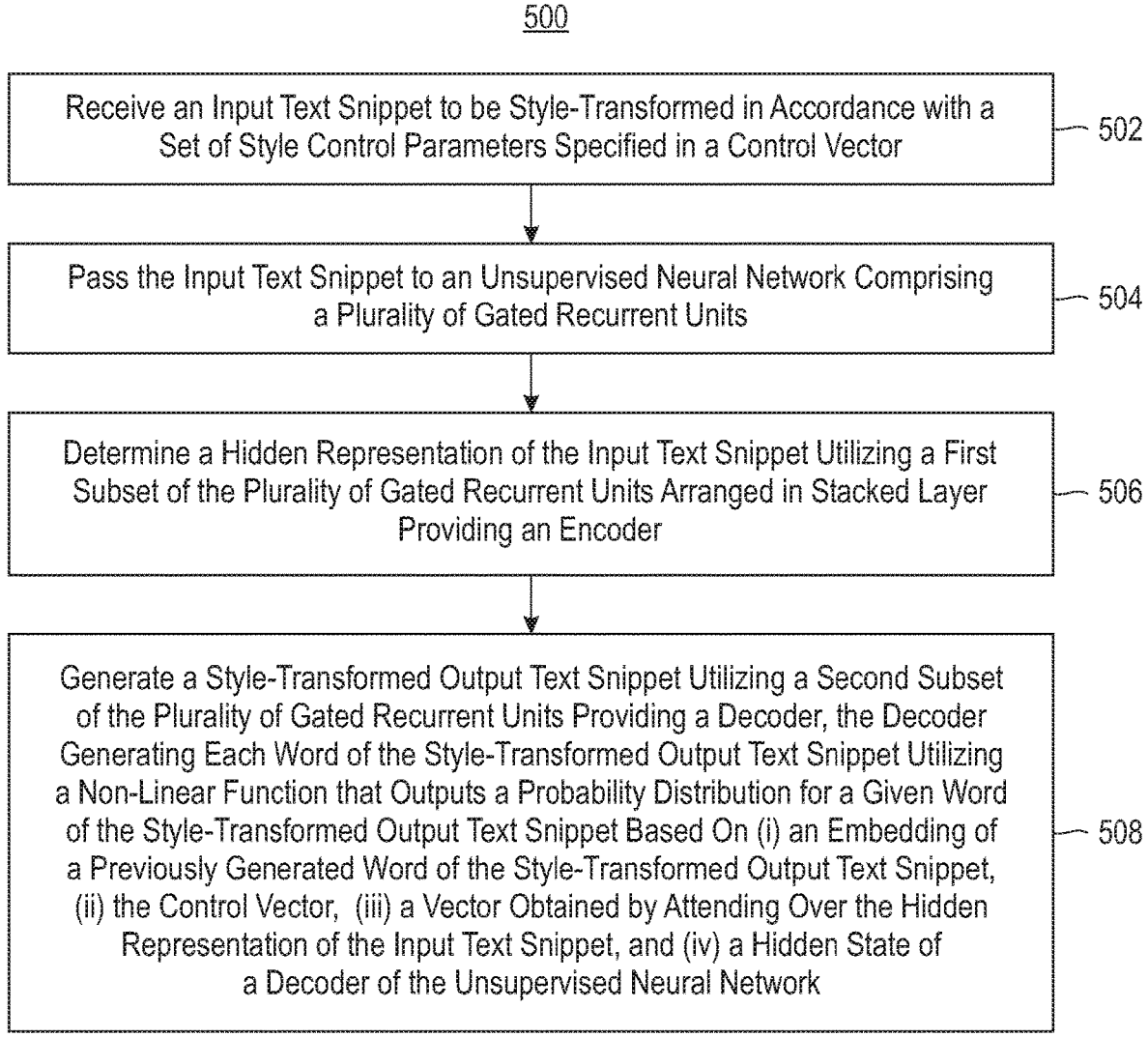
FIG. 5 depicts another process for controllable style-based text transformation, according to an exemplary embodiment of the present invention.

FIG. 5 depicts a process flow 500 for controllable style-based text transformation. The process flow 500 begins with step 502, receiving an input text snippet to be style-transformed in accordance with a set of style control parameters specified in a control vector. In step 504, the input text snippet is passed to an unsupervised neural network comprising a plurality of GRUs. A hidden representation of the input text snippet is determined in step 506 utilizing a first subset of the plurality of GRUs arranged in stacked layer providing an encoder. A style-transformed output text snippet is generated in step 508 utilizing a second subset of the plurality of GRUs providing a decoder. The decoder generates each word of the style-transformed output text snippet utilizing a non-linear function that outputs a probability distribution for a given word of the style-transformed output text snippet based on (i) an embedding of a previously generated word of the style-transformed output text snippet, (ii) the control vector, (iii) a vector obtained by attending over the hidden representation of the input text snippet, and (iv) a hidden state of a decoder of the unsupervised neural network.

The process flow 500 may further include training the unsupervised neural network by repeating steps 504, 506 and 508 utilizing a plurality of training input text snippets. For each generated style-transformed output text snippet corresponding to a given one of the training input text snippets, the training may include: producing a set of variants of the generated style-transformed output text snippet; selecting a given one of the variants of the generated style-transformed output text snippet based at least in part on semantic relatedness to the given training input text snippet, fluency of the given variant of the generated style-transformed output text snippet as measured using a designated language model, and a readability grade score of the given variant of the generated style-transformed output text snippet; and determining a set of style control parameters associated with the given variant of the generated style-transformed output text snippet. The given variant of the generated style-transformed output text snippet and its associated set of style control parameters are utilized as labeled training data to train the encoder and decoder of the unsupervised neural network.

The input received in step 502 may include text encoded in the form of embeddings, such as through an embedding look-up operation. The embeddings during training may be further encoded into deep representations using Long Short Term Memory (LSTM) cells. Collectively, this provides a shared encoder (e.g., the shared encoder module 316 in FIG. 3). For each domain (e.g., target writing style domain) of consideration, there is a decoder (e.g., one of decoders 316 in FIG. 3) that may also be built with LSTM units. Such LSTM units may be arranged in a bi-directional network. The decoder takes the encoded deep representations as input, as well as the control vector or a portion thereof. For example, the control vector may have a set of dynamic (e.g., target writing style domain-specific) and static (e.g., language or linguistic aspect-specific) control values. The outputs of all such decoders from the multiple target writing style domains are combined and sent to a shared decoder (e.g., shared decoder module 318 in FIG. 3) which may also be built with LSTM units. The shared decoder then predicts the output sentence. Using the decoder output, different scores may be computed. These scores may be real numbers that indicate various aspects of the output, including (i) how fluent or grammatical correct the output is, (ii) how adequate or relevant to the input the output is, and (iii) to what extent the output complies with the control vector (e.g., the dynamic and static control values) given as input. The inverse of the scores may be considered as losses. For computation of the scores, language or linguistic aspect scorers (e.g., language aspect scorer ensemble module 310 in FIG. 3) and domain-strength scorers (e.g., domain unique-style strength scorer module 306 in FIG. 3) may be used.

During training, the objective is to minimize the losses. During a testing or real-time usage phase, input text is fed in and encoded by the shared encoder. The control vector (e.g., including dynamic and static control values) and the encoded output from the shared encoder is provided to the decoders, whose output is concatenated and passed through the shared decoder. The output text, predicted by the shared decoder, is sentences or other text snippets with desired properties as specified by the control values in the control vector.

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
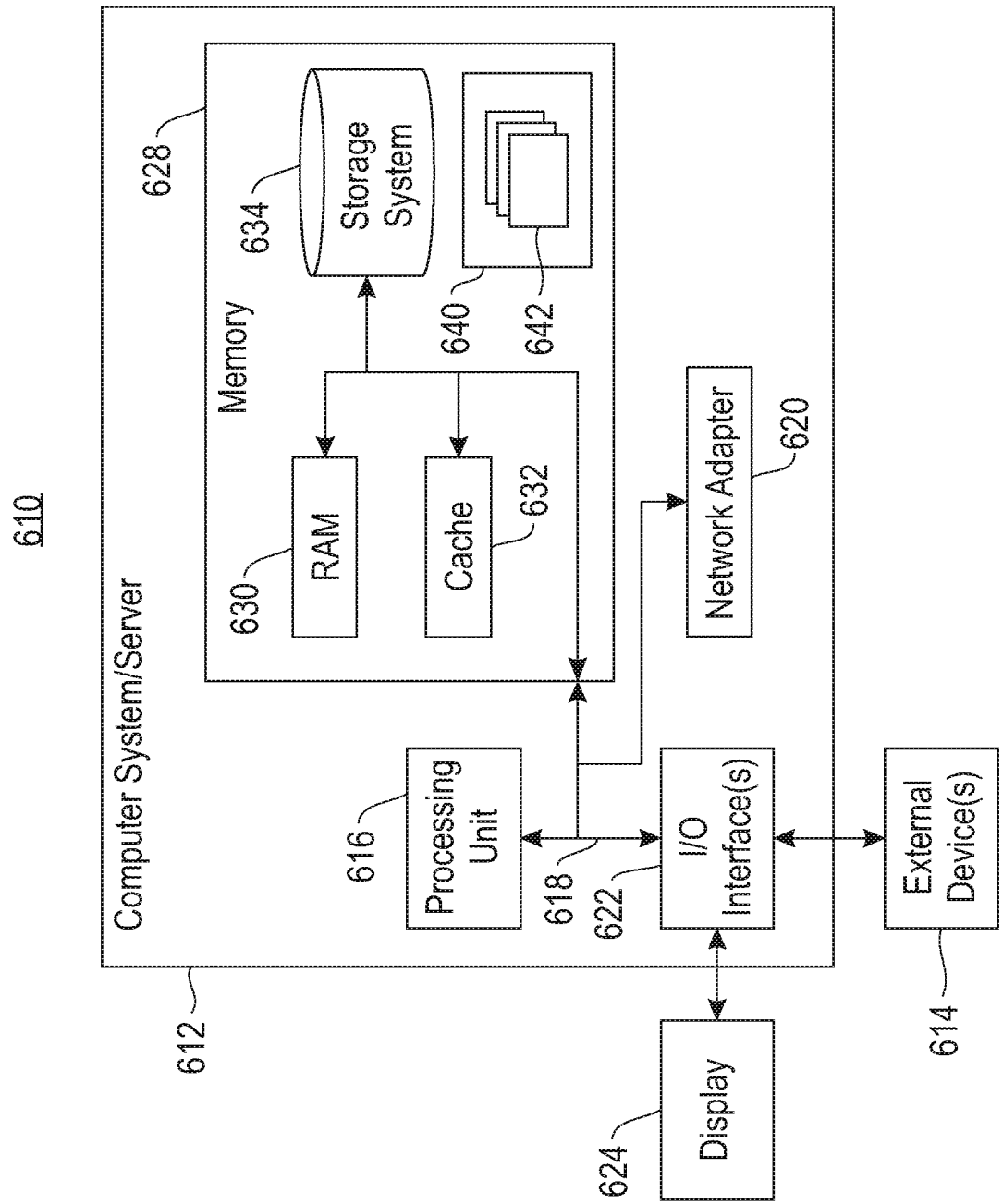
FIG. 6 depicts a computer system in accordance with which one or more components/steps of techniques of the invention may be implemented, according to an exemplary embodiment of the invention.

One or more embodiments can make use of software running on a general-purpose computer or workstation. With reference to FIG. 6, in a computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

The bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 612 typically includes a variety of computer system readable media. Such media may be any available media that is accessible by computer system/server 612, and it includes both volatile and non-volatile media, removable and non-removable media.

The system memory 628 can include computer system readable media in the form of volatile memory, such as random access memory (RAM) 630 and/or cache memory 632. The computer system/server 612 may further include other removable/non-removable, volatile/nonvolatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 618 by one or more data media interfaces. As depicted and described herein, the memory 628 may include at least one program product having a set (e.g., at least one) of program modules that are configured to carry out the functions of embodiments of the invention. A program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc., one or more devices that enable a user to interact with computer system/server 612, and/or any devices (e.g., network card, modem, etc.) that enable computer system/server 612 to communicate with one or more other computing devices. Such communication can occur via I/O interfaces 622. Still yet, computer system/server 612 can communicate with one or more networks such as a LAN, a general WAN, and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
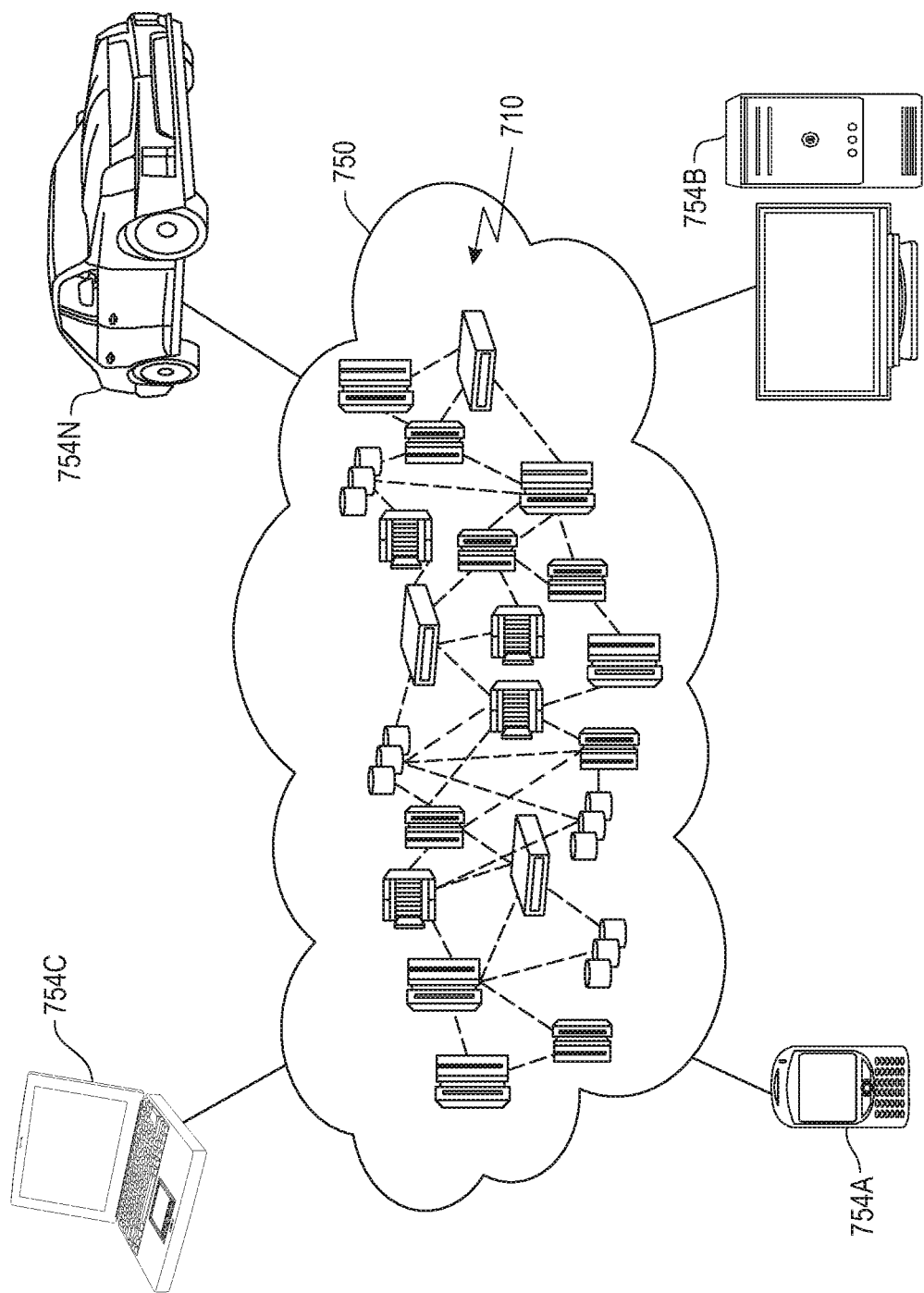
FIG. 7 depicts a cloud computing environment, according to an exemplary embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
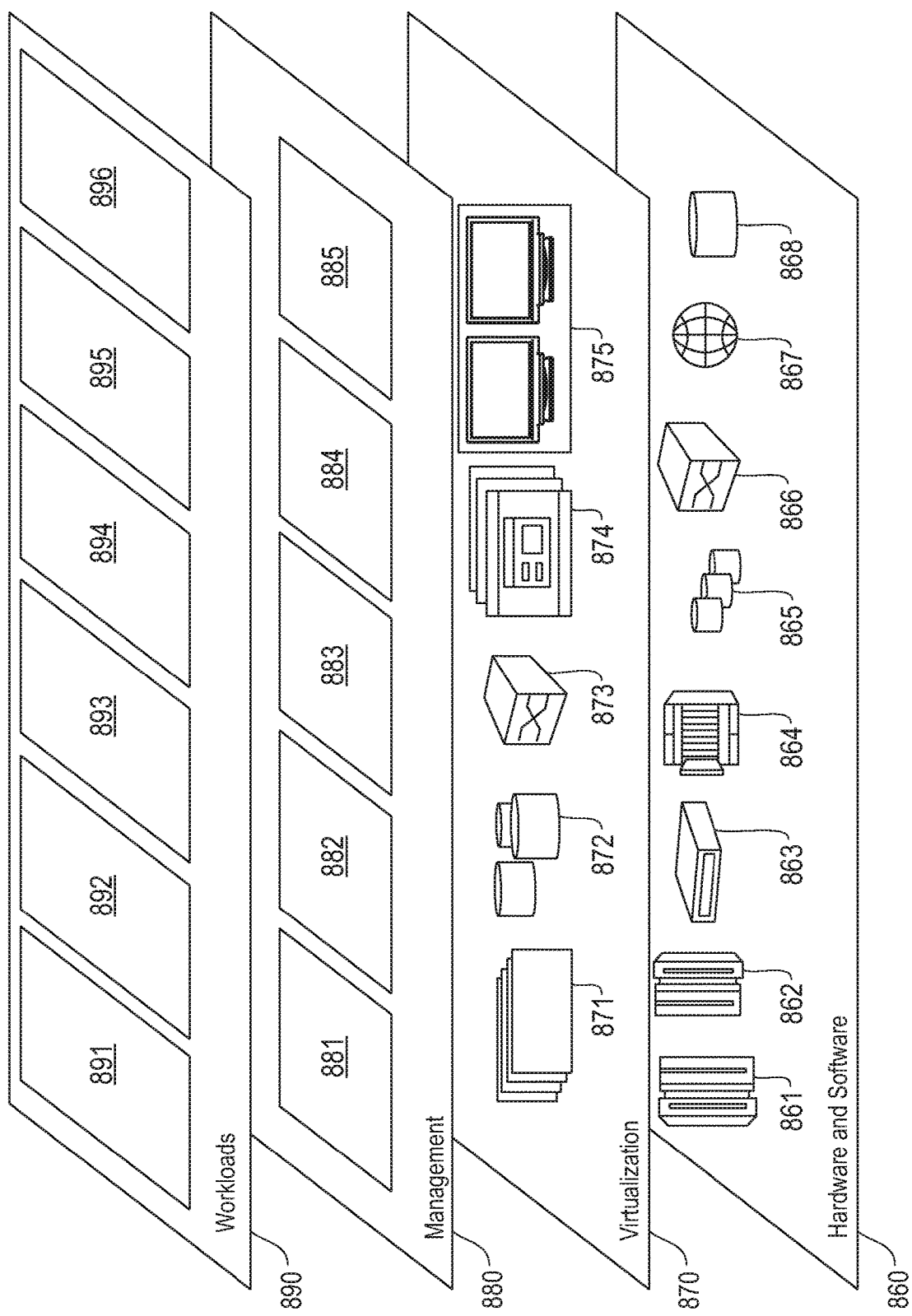
FIG. 8 depicts abstraction model layers, according to an exemplary embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and multi-style text transformation processing 896, which may perform various functions described above with respect to the text transformation techniques described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising steps of:
  obtaining input text;
  selecting a set of style specifications for transforming the input text, the set of style specifications comprising: one or more target writing style domains selected from a plurality of writing style domains; weights for each of the target writing style domains representing relative impact of the target writing style domains for transformation of the input text; and weights for each of a set of linguistic aspects for transformation of the input text; and generating one or more style-transformed output texts based at least in part on the set of style specifications, utilizing an unsupervised neural network;
wherein the steps are carried out by at least one processing device.

2. The computer-implemented method of claim 1, wherein the plurality of writing style domains comprises two or more of: a default domain; an academic domain; a technical domain; an advertisement domain; a legal domain; and a medical domain.

3. The computer-implemented method of claim 1, wherein the set of linguistic aspects comprises at least one of formalness, sentiment intensity, and tone.

4. The computer-implemented method of claim 1, wherein said selecting the set of style specifications comprises providing real number inputs as the weights for the selected target writing style domains in proportion to a desired relative impact of the selected target writing style domains on the style-transformed output texts.

5. The computer-implemented method of claim 1, wherein said selecting the set of style specifications comprises providing real number inputs as the weights for each of the set of linguistic aspects corresponding to a desired impact of the linguistic aspects on the style-transformed output texts.

6. The computer-implemented method of claim 1, wherein the unsupervised neural network comprises a deep learning network comprising a plurality of gated recurrent units.

7. The computer-implemented method of claim 1, wherein said generating the one or more style-transformed output texts comprises:
generating embeddings for the input text;
generating domain-specific style-transformed output text utilizing each of a subset of a plurality of decoders, the subset of the plurality of decoders being associated with the selected target writing style domains and being provided with the embeddings for the input text, the weights for the selected target writing style domains, and the weights for the set of linguistic aspects; and
generating a given one of the style-transformed output texts as a combination of the domain-specific style-transformed output texts from each of the subset of the plurality of decoders.

8. The computer-implemented method of claim 1, comprising:
training the unsupervised neural network, wherein training the unsupervised neural network comprises:
generating an embedding for a given training text from a given one of the plurality of domains;
generating domain-specific style-transformed training output texts utilizing a plurality of decoders associated with the plurality of writing style domains, a given one of the decoders corresponding to the given domain being provided with a set of training weights for a set of training writing style domains and the set of linguistic aspects, other ones of the decoders corresponding to other ones of the plurality of domains being provided with null weights for the training writing style domains and the set of linguistic aspects; and
generating a given style-transformed training output text as a combination of the domain-specific style-transformed training output texts from the plurality of decoders.

9. The computer-implemented method of claim 8, wherein said training the unsupervised neural network comprises:

determining a domain style score vector for the given style-transformed training output text, the domain style score vector comprising a list of scores each indicating to what degree the given style-transformed training output text follows the style of one of a set of training writing style domains; and
determining a linguistic aspect score vector for the given style-transformed output text, the linguistic aspect score vector comprising a score corresponding to each of the set of linguistic aspects computed using a natural language processing tool trained for that linguistic aspect.

10. The computer-implemented method of claim 9, wherein said training the unsupervised neural network comprises:
computing a first control loss indicating a gap between (i) the training weights for the set of training writing style domains; and (ii) the scores in the domain style score vector;
computing a second control loss indicating a gap between (i) the training weights for the set of linguistic aspects; and (ii) the scores in the linguistic aspect score vector;
computing a reconstruction loss by comparing fluency of the training input text and fluency of the given style-transformed training output text; and
computing a back-translation loss by performing back-translation of the given style-transformed training output text through the plurality of decoders.

11. The computer-implemented method of claim 10, wherein said training the unsupervised neural network comprises minimizing the first control loss, the second control loss, the reconstruction loss and the back-translation loss.

12. A computer program product, the computer program product comprising a non-transitory computer readable storage medium having program instructions embodied therewith, the program instructions executable by at least one computing device to cause the at least one computing device to perform steps of:
obtaining input text;
selecting a set of style specifications for transforming the input text, the set of style specifications comprising: one or more target writing style domains selected from a plurality of writing style domains; weights for each of the target writing style domains representing relative impact of the target writing style domains for transformation of the input text; and weights for each of a set of linguistic aspects for transformation of the input text; and
generating one or more style-transformed output texts based at least in part on the set of style specifications utilizing an unsupervised neural network.

13. The computer program product of claim 12, wherein said generating the one or more style-transformed output texts comprises:
generating embeddings for the input text;
generating domain-specific style-transformed output text utilizing each of a subset of a plurality of decoders, the subset of the plurality of decoders being associated with the selected target writing style domains and being provided with the embeddings for the input text, the weights for the selected target writing style domains, and the weights for the set of linguistic aspects; and
generating a given one of the style-transformed output texts as a combination of the domain-specific style-transformed output texts from each of the subset of the plurality of decoders.

14. The computer program product of claim 12, wherein the program instructions are executable by the at least one computing device to cause the at least one computing device to perform the step of training the unsupervised neural network, wherein said training the unsupervised neural network comprises:

generating an embedding for a given training text from a given one of the plurality of domains;

generating domain-specific style-transformed training output texts utilizing a plurality of decoders associated with the plurality of writing style domains, a given one of the decoders corresponding to the given domain being provided with a set of training weights for a set of training writing style domains and the set of linguistic aspects, other ones of the decoders corresponding to other ones of the plurality of domains being provided with null weights for the training writing style domains and the set of linguistic aspects; and generating a given style-transformed training output text as a combination of the domain-specific style-transformed training output texts from the plurality of decoders.

15. A system comprising:

a memory; and at least one processor coupled to the memory and configured for:

obtaining input text;

selecting a set of style specifications for transforming the input text, the set of style specifications comprising: one or more target writing style domains selected from a plurality of writing style domains; weights for each of the target writing style domains representing relative impact of the target writing style domains for transformation of the input text; and weights for each of a set of linguistic aspects for transformation of the input text; and generating one or more style-transformed output texts based at least in part on the set of style specifications utilizing an unsupervised neural network.

16. The system of claim 15, wherein said generating the one or more style-transformed output texts comprises:

generating embeddings for the input text;

generating domain-specific style-transformed output text utilizing each of a subset of a plurality of decoders, the subset of the plurality of decoders being associated with the selected target writing style domains and being provided with the embeddings for the input text, the weights for the selected target writing style domains, and the weights for the set of linguistic aspects; and generating a given one of the style-transformed output texts as a combination of the domain-specific style-transformed output texts from each of the subset of the plurality of decoders.

17. The system of claim 15, wherein the at least one processor is configured for training the unsupervised neural network, wherein said training the unsupervised neural network comprises:

generating an embedding for a given training text from a given one of the plurality of domains;

generating domain-specific style-transformed training output texts utilizing a plurality of decoders associated with the plurality of writing style domains, a given one of the decoders corresponding to the given domain being provided with a set of training weights for a set of training writing style domains and the set of linguistic aspects, other ones of the decoders corresponding to other ones of the plurality of domains being provided with null weights for the training writing style domains and the set of linguistic aspects; and generating a given style-transformed training output text as a combination of the domain-specific style-transformed training output texts from the plurality of decoders.

18. A computer-implemented method, comprising steps of:

receiving an input text snippet to be style-transformed in accordance with a set of style control parameters specified in a control vector;

passing the input text snippet to an unsupervised neural network comprising a plurality of gated recurrent units;

determining a hidden representation of the input text snippet utilizing a first subset of the plurality of gated recurrent units arranged in a stacked layer providing an encoder; and generating a style-transformed output text snippet utilizing a second subset of the plurality of gated recurrent units providing a decoder, the decoder generating each word of the style-transformed output text snippet utilizing a non-linear function that outputs a probability distribution for a given word of the style-transformed output text snippet based on (i) an embedding of a previously generated word of the style-transformed output text snippet, (ii) the control vector, (iii) a vector obtained by attending over the hidden representation of the input text snippet, and (iv) a hidden state of a decoder of the unsupervised neural network;

wherein the steps are carried out by at least one processing device.

19. The computer-implemented method of claim 18, comprising:

training the unsupervised neural network by repeating the passing, determining and generating steps for each of a plurality of training input text snippets and, for each generated style-transformed output text snippet corresponding to a given one of the training input text snippets:

producing a set of variants of the generated style-transformed output text snippet;

selecting a given one of the variants of the generated style-transformed output text snippet based at least in part on semantic relatedness to the given training input text snippet, fluency of the given variant of the generated style-transformed output text snippet as measured using a designated language model, and a readability grade score of the given variant of the generated style-transformed output text snippet; and determining a set of style control parameters associated with the given variant of the generated style-transformed output text snippet.

20. The computer-implemented method of claim 19, comprising:

utilizing the given variant of the generated style-transformed output text snippet and its associated set of style control parameters as labeled training data to train the encoder and decoder of the unsupervised neural network.

* * * * *